July 5, 1966 W. H. COULTER ETAL 3,259,891
DEBRIS ALARM
Filed May 1, 1964 5 Sheets-Sheet 1

Inventors
Wallace H. Coulter
Walter R. Hogg
By Silverman & Cass
Attorneys

July 5, 1966  W. H. COULTER ETAL  3,259,891
DEBRIS ALARM
Filed May 1, 1964  5 Sheets-Sheet 3

Inventors
Wallace H. Coulter
Walter R. Hogg
By Silverman & Cass
Attorneys

July 5, 1966
W. H. COULTER ETAL
3,259,891
DEBRIS ALARM
Filed May 1, 1964
5 Sheets-Sheet 4
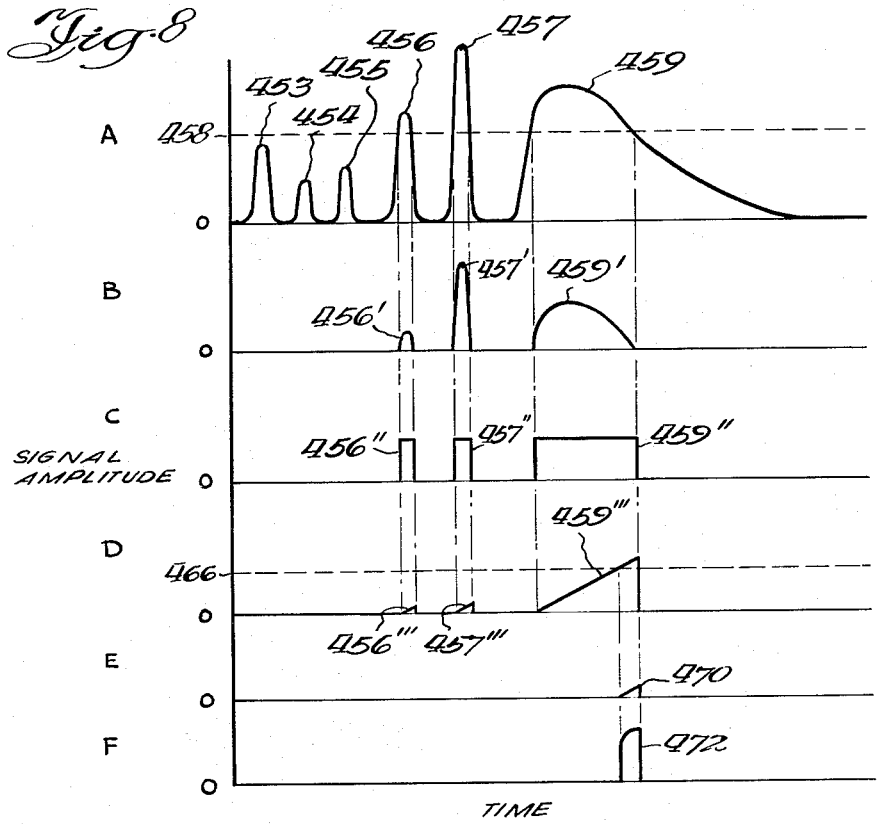
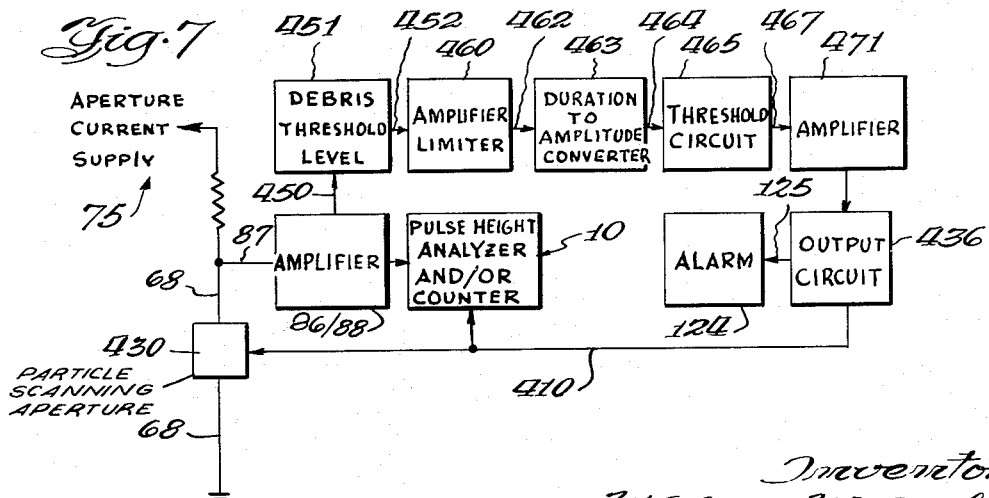
Inventors
Wallace H. Coulter
Walter R. Hogg
By Silverman & Cass
Attorneys July 5, 1966 W. H. COULTER ET AL 3,259,891
DEBRIS ALARM
Filed May 1, 1964 5 Sheets-Sheet 5

Inventors
Wallace H. Coulter
Walter R. Hogg
BY Silverman & Cass
attorneys

United States Patent Office 3,259,891
Patented July 5, 1966

3,259,891
DEBRIS ALARM
Wallace H. Coulter and Walter R. Hogg, Miami Springs, Fla., assignors to Coulter Electronics, Inc., Hialeah, Fla., a corporation of Illinois
Filed May 1, 1964, Ser. No. 364,070
48 Claims. (Cl. 340—222)

This application is a continuation-in-part of a co-pending application Serial No. 834,860 filed August 19, 1959, for a Particle Analyzing Device, filed in the name of the applicants herein along with two others, the structure common to this application and said co-pending application being the joint invention of only the applicants herein.

This invention relates generally to particle analyzing apparatus and more particularly is concerned with a circuit arrangement incorporated into or used in connection with such analyzing apparatus for detecting abnormal functioning of the scanning means of the analyzing apparatus as caused by some obstruction thereof. The invention is also concerned with means operated by the circuit detecting the abnormal operation, to warn or alarm the operator that the scanning means is acting in an abnormal manner, to alleviate the cause of the abnormality, to introduce a correction into the output of the analyzing apparatus for the period of abnormality, or to provide a combination of some or all of these functions.

This being an invention which provides the above described functions for the first time, insofar as we are aware, in connection with a particle analyzing device, the primary object may be stated to be the accomplishment of the above functions by providing a device incorporated into or arranged as an adjunct or accessory to the particle analyzing apparatus.

The structure of the said co-pending application and the particle analyzing device referred to herein use the principle of operation which has become universally known as the Coulter principle and which is embodied in Coulter U.S. Patent 2,656,508. Wallace H. Coulter, the patentee of said patent is the same person as the co-applicant herein.

The Coulter principle is that where a particle of microscopic material is suspended in a fluid whose electrical impedance is different from the electrical impedance of the particulate matter, the presence or absence of the particle in a small volume of the fluid may be detected due to the effect of the particle upon the total impedance of the confined volume. The practical application of this principle has been embodied in apparatus now familiar to those skilled in the particle field, and sold as the "Coulter Counter", by Coulter Electronics, Inc., Hialeah, Florida. In the practical device, a fine aperture is provided in an insulating wall, the size of the aperture being what may be termed macroscopic to microscopic, usually between ten to several hundred microns in diameter. The particulate material to be studied may range from biological cells to a wide variety of industrial particles, and may range in size from a fraction of a micron to several hundred microns in diameter. The diameter of the aperture is normally chosen to be somewhat larger than the largest diameter of particle it is expected to encounter.

An electric current is caused to flow through the fluid suspension in the aperture usually by means of electrodes immersed in the suspension on opposite sides of the wall and simultaneously the suspension itself is caused to flow through the aperture from the side of the wall having the material under study. Due to the dimensions involved, the particles flow through at a very rapid rate and each time a particle passes through the aperture, there is a change in the total impedance of the fluid path which is effectively included in the aperture. The effective dimensions of the sensing zone of the aperture are the diameter and the length; but electrically, the sensing zone extends to a portion of the fluid beyond the ends of the aperture where the current density is still very high. In the body of the suspension beyond the sensing zone the current density is so small that the presence or absence of particles has no practical effect upon the impedance in the path of the current flowing between electrodes. Within the effective length or sensing zone of the aperture, however, the passage of a particle which is a very small fraction of the diameter of the aperture is usually sufficient to cause a detectable and even measurable change in impedance.

The Coulter principle recognizes that this change in impedance is a direct function of the volume of the particle passing through the aperture, and the duration of the change is a function of the time that the particle has been in the aperture sensing zone. Both the structures of the patent mentioned above and the co-pending application utilize this principle in different manners, but in each case the aperture is the effective scanning means, scanning the particles as they pass within the influence of the aperture, and producing an electrical signal whose duration and amplitude are related respectively to the time the particle is in the scanning zone and the size of the particle. The output of the scanning means, that is, the signal immediately produced by the aperture is treated differently in structure of the patent and that of the application, and different Coulter Counters have been commercially sold embodying these differences. In the case of the structure described in the patent, the signal is applied to the grid circuit of a high impedance input amplifier, and is thereafter counted and sized within the limits of the apparatus. In the case of the structure of the co-pending application, the signal from the aperture is injected into the cathode of a current-sensitive and hence low impedance input amplifier, and is thereafter counted and sized using circuitry of improved and more accurate characterization.

In both embodiments, the sensitivity of the apparatus is related inversely to the amount of fluid which is included in the effective aperture, and hence to the diameter and length of the aperture. Calibration depends upon these dimensions being fixed during the period that a determination is made. A decrease in the diameter of the aperture, caused by the presence of a piece of debris lodging in the aperture will cause an increase in the amplitude of the signal pulse produced by passage of a particle over the amplitude which the pulse would have under normal conditions. Furthermore, the total count for a given run or sampling is frequently based upon establishing a constant flow rate through the aperture over a given period of time. If the aperture is blocked either partially or fully, the determination will be erroneous. The statistical value of constant flow of particles will be useless, since the abnormal operation of the scanning means has prevented the passage of a representative number of particles. The size information is erroneous, since the sensitivity of the aperture has been materially changed.

In the art of counting and sizing minute particles by the Coulter apparatus, normally the range of particles at its limits is well within the physical diameter of the aperture which is chosen to scan the particles as they pass through. Experience has shown, however, that even the most specialized suspension of particles will at times produce a blockage or "hanging up" of a particle at the entrance of the aperture. Other kinds of studies will produce frequent blockages. Many industrial studies require the examination of particles ranging from the very small to the very large, and it is expected that there will be blockages. Blockages may be caused by lint, dirt and other debris. For example, in the use of the apparatus to count and size certain biological cells that are inextricable intermixed with another kind of cells, the undesired cells are dissolved by chemicals, but produce shreds that constitute debris. Such debris as well as sediment other unwanted particles normally cause noise that can be discriminated against. However from time to time agglomerations of debris may catch on the aperture entrance to cause a partial or complete blockage.

In particle studies where fibres are involved, it is sometimes necessary to study particles whose lengths are longer than the diameter of the aperture. For the most part these align with the aperture axis and readily pass through, but from time to time one will adhere cross-wise to the aperture entrance.

For the purpose of this application, anything which will partially or fully obstruct the aperture will be called debris, irrespective of whether it is of the same particulate matter as the particles being studied or whether it is foreign matter. Also for purposes of this application, any apparatus which will produce an output signal or accomplish a function as a result of the occurrence of debris blocking or partially blocking the aperture will be called a debris alarm, even if there is no warning at all involved.

Before explaining the details of the invention, it will be advantageous to understand how this problem has been handled in the past. The problem has been present since the advent of apparatus using the Coulter principle. The technician could sometimes sense the presence of debris by a sudden and marked decrease in the clicking of the counter, by a cessation in the counting, by a change in the appearance of the pulses viewed on a cathode ray oscilloscope, or by an inexplicable inconsistency in results. The apparatus as a rule had a microscope continuously focussed on the aperture, and when one suspected debris, he could view the aperture. A simple wiping of the surface of the aperture tube over the aperture usually dislodges the debris and causes it to move so far from the aperture that statistical chances of it returning for the next several runs are substantially less than new debris appearing in these runs.

The presence of debris obstructing the aperture is annoying and disturbing. The data and information which are being taken may be upset or rendered useless. Wiping a tube with the finger is crude and cannot always be done because of the nature of the sample. Many other inconveniences and adverse results occur depending upon the manner in which the apparatus is being used. It is obviously an important object of the invention to alleviate these disadvantages and annoyances, and in the course of doing so, save time and enable more accurate data and statistics to be taken using the Coulter apparatus. Reliability obviously also increases.

The debris alarm, regardless of its original function which shortly will be covered, must operate on the basis of a sensing of the existence of the obstruction. Since the particles passing through the aperture produce signals which are related to the time duration of the particle within the aperture and to the size of the particle, these two pieces of information either together or separately may be used for sensing an abnormal condition within the aperture. With respect to the time duration obviously a particle or piece of debris which has become lodged in the aperture will cause the production of a signal having a longer than normal time duration. Using this information, apparatus may be constructed which is capable of distinguishing between signals of long and short duration, discarding the short duration or normal duration signals and becoming energized, operative or activated by signals of longer duration. Such apparatus may in nowise be affected under certain circumstances by any but long duration signals.

Debris detection by circuits sensitive to the amplitudes of signals is not as reliable as detection by circuits responsive to the duration of the pulse signals. Although the discussion which follows will be directed at detection based on time duration the invention is not limited to only this method.

Coming now to the performance of a function by what has been defined as a debris alarm, there are many different activities or actions which the debris alarm may be arranged or constructed to perform. These may be individual functions or they may be joint functions.

One function may be that of warning that there has been an obstruction. The debris alarm may therefore energize an audible device such as a bell or buzzer or horn and/or it may light a light. In the case of automatic recording equipment, it may at the same time disable the recording apparatus so that the operator will know that the data recorded after the debris alarm has operated is of no significance.

The Coulter apparatus with which the debris alarm is associated is widely used to count and size particles. In addition, as explained herein, there may be a timing mechanism based upon a clocking frequency and pulse counter. The debris alarm readily can shut off the counting apparatus and the clock timing device.

If desired, the debris alarm may completely disable the entire device, but in some applications all that is necessary is to discard such of the data that are produced during the time a particle is lodged in the aperture without discarding the data derived prior to the obstruction of the aperture. This results in no appreciable deleterious effects on the satistics of the determination. It becomes obvious, therefore, from a consideration of this invention that in addition to shutting off the operation of the counting device, for example, if the debris alarm is capable of clearing the aperture, the run or project may continue without any need for manual operation or manipulation thereof.

Accordingly, there are several ways in which the aperture may be cleared without the need for activity on behalf of the operator. The aperture tube may be provided with a wiping member that is driven automatically when the debris alarm operates so that the wiping of the surface of the aperture is accomplished mechanically much in the same manner that a technician might use his finger. The aperture tube may in other cases be provided with a device which applies pressure to the aperture from the inside thereof and literally blows the aperture out, dislodging the debris that is "hung up." A movable plunger with a fine wire may mechanically eject the debris. In another structure, the aperture may be cleared by discharging a capacitor which has been charged to a high voltage, upon command of the debris alarm, through the aperture fluid to cause sudden expansion of the aperture contents.

Accordingly, it is another object of the invention to provide a debris alarm which, in addition to or instead of producing a warning signal and/or cutting off the operation of the counting mechanism, will clear the aperture to restore its operation to normal.

Many other objects of the invention are contemplated, including:

a. The provisions of apparatus including a controlled electronic device, such as for example a gas tube or equivalent semi-conductor rapidly responsive to signals indicating abnormal operation of the scanning means of the particle analysis apparatus with which the same is associated to produce an output signal until some action has been taken to render the scanning means once more normal or a short, self-erasing signal;

b. The provision of apparatus for disabling particle analysis and display circuits upon receiving an indication that the scanning means is in an abnormal condition;

c. The provision of means for stopping the timing means when the aperture becomes obstructed, and thereafter starting the timing apparatus when the aperture is cleared;

d. The provision of means which operates upon the basis of an unusually long duration of signal to operate the debris alarm.

Other objects and advantages will appear to those skilled in this art from a consideration of the following description of illustrative embodiments of the invention showing the preferred manners in which the same are intended to be carried out, in connection with which the drawings illustrate the same. Such illustrations are primarily diagrammatic and symbolic in nature to keep the specification short and clear, but the disclosure is believed fully made and with sufficient detail to give a complete understanding of the operation of the invention and to enable those skilled in this art to construct and use the same, either as an accessory or adjunct to the Coulter apparatus, or as an integral part thereof.

In the said drawings:

FIG. 7 is a block diagram of a debris alarm device in which the means for discriminating between particle-caused signals and debris-caused signals uses both amplitude and duration characteristics of the resulting signals.

FIG. 8 is a series of six graphs, from A to F inclusive, all on the same time axis, and showing the progress of pulses through the apparatus of FIG. 7.

Figure 1:
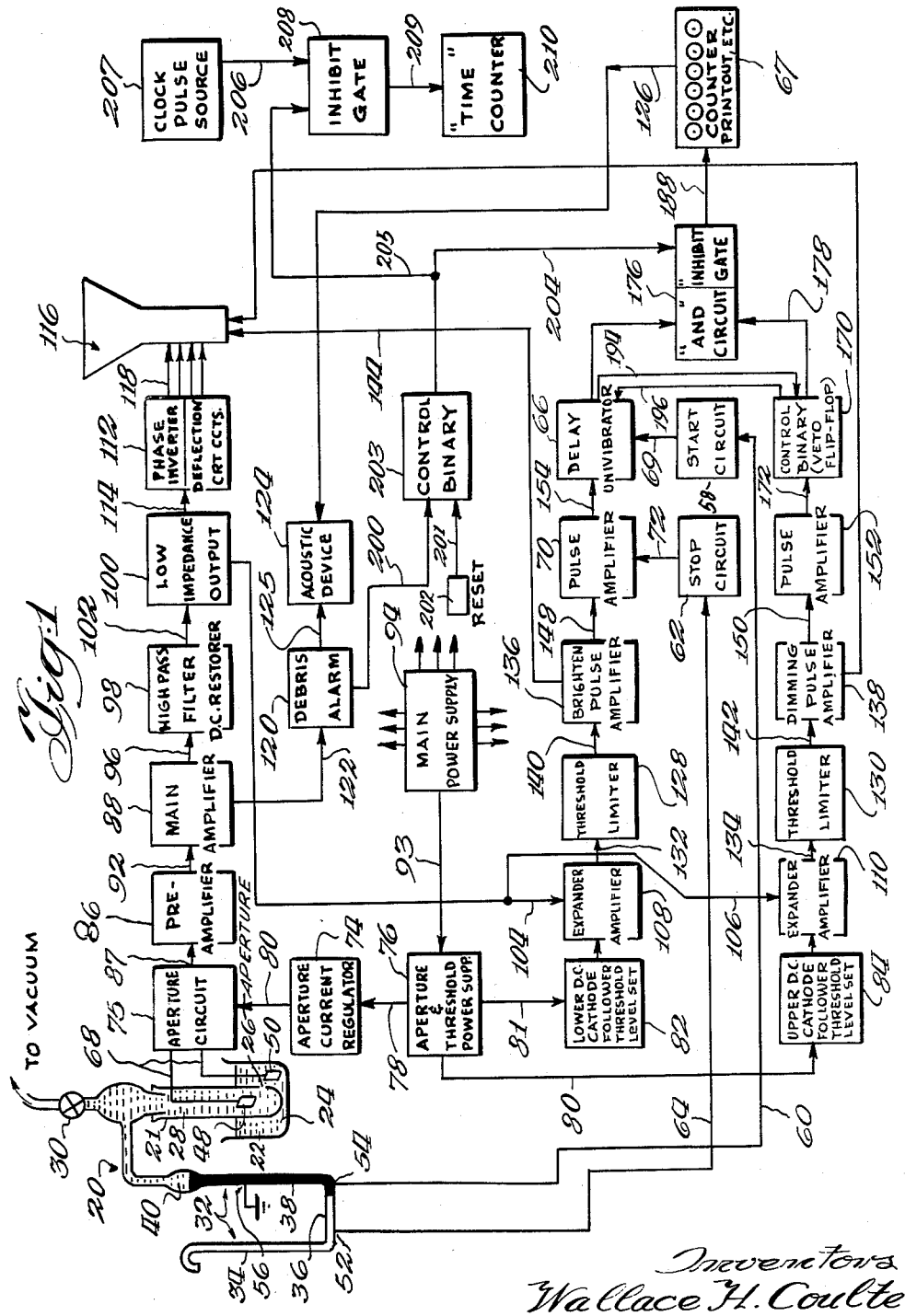
FIG. 1 is a block diagram of apparatus utilizing the Coulter principle as disclosed in the said co-pending application, and corresponding generally to FIG. 1 of the said application.

The invention herein is characterized by several concepts which it is perhaps advisable to set forth in some detail. These concepts will best be understood if preceded by a short summary of the operation of the particle analysis apparatus, including some definitions therewith.

The Coulter particle analysis apparatus is intended for the counting and sizing of particles, and this is true of both the apparatus of the patent above referred to and that of the co-pending application. A pair of vessels are provided, usually one inside of the other, these being of glass or other insulating material, and the inner vessel is usually a part of a fluid metering system so that it is completely filled with a fluid. The usual system includes a mercury manometer for metering purposes, so that the fluid is in inter-face contact with the mercury. The outer vessel is filled with a fluid having the particles being studied in suspension, and the aperture above described is provided in the inner vessel and immersed below the surface of the suspension. The suspension fluid and the particles have different electrical impedance, the fluid usually being an electrolyte The mercury is unbalanced and caused to apply suction to the system in which the fluid of the inner vessel is connected, thereby drawing the suspension through the aperture. By a system of electrical contacts in the path of the mercury, electrical circuits are completed and broken to render the counting and sizing circuit operative for the period that a predetermined volume of fluid has been accurately metered through the aperture. This is described in some detail in U.S. Patent 2,869,078.

The vessels have respective electrodes making electrical contact with the fluids therein, and the only electrical path that can be taken by any electric current flowing between the electrodes in the fluid must be through the aperture. This arrangement places the impedance of the fluid which is contained in the effective aperture in a series circuit between the electrodes. A current source is connected to the electrodes to provide a current in the aperture through the fluid thereof. The current density in the minute aperture becomes quite high, in fact, so high that if permitted to stagnate, the fluid in the aperture will usually boil. As a general rule, therefore, no current is applied to the circuit containing the aperture fluid until the fluid is physically flowing. The system comprising the electrical manometer contacts may be used to switch off the aperture current when the fluid comes to rest. Other means may be used in this type of apparatus to cut off the electric current when the fluid is not flowing.

When a particle is passing through the aperture, it will change the impedance of the aperture by an amount that is related to the volumetric size of the particle and this change will have a duration which is related to the time that the particle is in the sensing zone aperture. The resulting change in impedance causes a signal, which usually is applied through a coupling condenser to an amplifier and from there to various other pulse shaping and operating circuits which are described in detail in the co-pending application and which will not be treated in great length herein.

Not all Coulter apparatus uses a manner of operation which includes the metering of a specific volume of fluid, this latter method being especially applicable in counting. Other apparatus may use a specific timing arrangement, and still further apparatus may not provide any special means for determining the number of particles in a given volume of fluid. These latter may be used by those more interested in size distribution than concentration. For example, a given sample may be passed through the apparatus and counts taken of the number of particles of several ranges of size. This may be done simultaneously with a multi-channel device or may be done in a number of consecutive runs using a pair of variable threshold levels to define the range of particles in each run. Each run may be timed or may again use the volumetric measurement as a common denominator.

The aperture of the apparatus and its included fluid constitute scanning means, by virtue of the relation of dimensions of the aperture with respect to the particles and the presence of the aperture current. In its normal condition, it has a predetermined impedance, and a sensitivity which will produce a signal having a known amplitude relation to the particle producing it. The obstruction of the aperture by debris changes the conditions so that the aperture is operating, if at all, under abnormal conditions. The resulting signals are usually nondescript, may have no value or information to pass on to the operator, and may upset the value of data taken thus far. They may be useful under special circumstances only, for counting.

The invention is characterized by the provision of means detecting the abnormal condition and performing various functions by using the signal.

The basic concept of this invention is a circuit which has the ability to recognize that the aperture is in abnormal condition and perform some function as a result thereof. This is called a debris alarm, generally.

Another concept of the invention is characterized by the provision of the combination of a particle analysis device, which may include a pulse height analyzer and counter, with a debris alarm device to give an indication of faulty operation.

Another concept of the invention is characterized by the provision of a debris alarm device which operates independently of the particle analysis device.

Another concept of the invention is characterized by the provision of a debris alarm, either alone or in combination with a particle analysis device, which clears the obstruction of the aperture tube when operated.

Another concept of the invention is characterized by the provision of a debris alarm which disables the counting device of the particle analysis apparatus when operated, either with or without performing other functions.

All of the above are further characterized in the provision of electrical circuitry which can distinguish between the signals produced by the aperture and its associated elements when normal particles pass through and those caused by an obstructive piece of debris. Such distinguishment may be base upon the excessive time duration of such debris or may be based upon time duration and excessive amplitude.

Referring now to the drawings, in FIG. 1, there is shown a block diagram of particle analyzing apparatus incorporating an embodiment of this invention. The apparatus shown in simple diagrammatic form in the upper left-hand portion of the figure is often referred to as the sample stand, since it is usually mounted on some form of standard which supports the same and permits the test suspensions to be associated therewith. This stand is designated 20 generally, and comprises basically a pair of vessels 21 and 22 of some insulating material, the inner vessel being a closed tube known in the art as the aperture tube and the outer vessel being a simple beaker, or the like, adapted to be brought up into engagement with the tube so that the bottom end of the tube is immersed in the body of suspension 24 carried in the outer vessel 22. One vetrical wall of the inner tube 21 is shaped to provide a flat planar surface and this surface has a fine aperture 26 which, in most instances, ranges from 10 to 200 microns in diameter. The interior of the tube 21 is filled with a suspension in the form of a body of fluid 28 which may or may not be the same as that of the body 24. The body 24 has suspended particles whose concentration or properties it is desired to study. The upper end of the tube 21 is connected to a source of vacuum through a valve 30 and to a manometer-syphon structure 32. The fluid system including the body of fluid 28 is fully enclosed and airtight.

The manometer-syphon structure comprises a simple, U-shaped, mercury manometer arrangement having a relief capillary tube 34 open to the atmosphere, a measuring section 36 of connected capillary tubing, preferably arranged horizontally or nearly so, and a vertical section 38 which connects with the upper end of the tube 21 through a reservoir 40. The tubing is all capillary or nearly so. If a vacuum is applied to the fluid body 28, it will draw fluid from the body 24 through the aperture 26 as this occurs, and any particles which are suspended in body of fluid 24 will also pass through the aperture 26. With so fine opening in the aperture 26, the fluid and particles will move through at very high speeds.

The aperture 26 is the only electrical and physical path existing between the two vessels 21 and 22, and if there is a potential which is applied across the electrodes 48 and 50 suspended respectively in the vessels, the only flow of exciting current possible is through the aperture. The aperture impedance is dependent upon temperature, the ion concentration and other factors. The particles have a different conductivity than the suspension fluid and hence, as they pass through the aperture 26, they change the impedance of the electrical path in the aperture sensing zone. These changes produce electrical or current modulations which are detectable signals.

The stand 20 provides the modulating signals and the signals or pulses for starting and stopping the counting and sizing apparatus. It has ben explained how the modulating pulses are provided, and as for the start and stop pulses, these are produced by means of suitable electrodes at 52 and 54 in the measuring section 36 of the manometer. There is a common or grounding electrode in the capillary tubing at 56.

Assume that the apparatus has been set into operation by energizing the same through suitable power sources. The mercury which is shown as the dark portions of the manometer-syphon structure 32 is equalized in the manometer. With the vessels in the position shown, the valve 30 is opened and the vacuum supply tends to draw some of the body of fluid 28 through the valve 30. Since the aperture 26 provides greater resistance to passage of fluid than the open-ended manometer-syphon 32, the mercury is raised in the section 38 before any substantial quantity of suspension is drawn in through aperture 26. This is permitted to continue until the column of mercury has passed to the right of the electrode 54. The valve 30 is then closed, and the mercury column permitted to drop to equalize itself.

As the column drops, it syphons fluid by displacement into the tube 21 through the aperture 26. When the column of mercury engages the first electrode 54, it closes a circuit through itself to the electrode 56 and energizes the start circuit 58. In this FIG. 1, the connecting lines are to be considered electrical paths or channels rather than connecting electrical leads, although for the most part the paths or channels are the same as electrical connections. The start channel is designated 60. As the mercury passes the measuring or metering section 36, a predetermined volume of suspension is drawn through the aperture 26. When the mercury column reaches the electrode 52, the stop circuit 62 is energized through the channel or path 64. The counter 67 will record only the number of pulses which were produced in the channel 68 during the scanning period, which were permitted passage through the apparatus by the various control circuits. Theoretically, without making any limitations on the size of the pulses accepted or rejected by the apparatus, all of the pulses will be counted and a record had of all the particles which passed through the aperture during the movement of the mercury column along the metering section 36.

As illustrated, the mercury column has just started the apparatus and is passing through the metering section.

The pulse from the manometer-syphon 32 which is applied to the start circuit 58 is in the nature of a positive pulse. This pulse may be applied in actuating relation to a power amplifying device such as a relay, gas filled thyratron or switching transistor, none of which need be shown specifically in the drawing of FIG. 1. Actuation of this device turns on the counting circuit by energizing, in turn, the delay univibrator 66 in the path 69. The connection established by the stop channel 64 operates a suitable power controlling device, such as a relay, or electronic device also in the stop circuit 62. This device short circuits the screen grids of tubes in the pulse amplifier 70 through the path 72 so that the counter circuits have no input. Suitable disabling of transistor circuits may accomplish the same purpose.

In an alternative structure in accordance with the invention, the aforementioned functions are accomplished by employment of a diode connected in a forward direction with the output lead 188 from "AND" circuit 176 to counter 67. In this alternative circuit, not shown specifically, the diode is normally reverse-biased, by a suitable potential source to prevent transmission therethrough of signals to be counted. In this alternative embodiment of the invention, circuit arrangements are provided for short circuiting the reverse biasing potential source to ground by way of the manometer start contact. In this fashion the blocking reverse bias is removed from the diode by way of the path through the start contact.

The aperture current regulator 74 preferably is a vacuum tube circuit which regulates the excitation current in the aperture circuit 75, maintaining it at some predetermined value controlled by the voltage output of the high impedance power supply 76. The path between the aperture and threshold supply 76 and the aperture current regulator 74 is designated 78. A voltage from the power supply 76 provides a reference voltage for the aperture current regulator 74. A voltage from the same source of supply is coupled to the threshold potentiometers of the lower and upper D.C. cathode follower threshold level sets 82 and 84, the general paths being designated 81 and 80 respectively. This eliminates the need for voltage regulator tubes and other complex regulation and adjustment circuitry in the aperture regulator 74 and the threshold level sets 82 and 84 because it assures that the voltage in the threshold potentiometer is proportional to that which serves as the reference in the aperture current regulator. Changes in line voltage will affect threshold and regulator circuits in the same proportional manner and hence the proportionality of pulse amplitude relative to particle size will be maintained for constant gain.

All voltages in the apparatus may be obtained from a suitable main power supply 94 which is fed from an external source such as a power line, and this power supply may include a so-called constant potential transformer maintaining one or more voltages at a fairly constant level. It may have an output voltage at some low level, on the order of 6 volts or so, in order to minimize power frequency hum, and may be connected to provide the source of power for the aperture and threshold power supply 76, as indicated by the path 93.

The pre-amplifier 86 and the fluid path in the aperture 26 are both connected across the regulated power supply of the regulator 74. The block 75 is merely shown as it is for convenience, and could represent the stand 20, together with isolating resistors, reversing switches and the like, and the channels 87 and 80 are only to show that there are appropriate connections between the components.

In the apparatus there are two amplifiers, designated pre-amplifier 86 and main amplifier 88 connected by the channel 92. The input of pre-amplifier 86 is taken across the fluid path of the aperture 26, as mentioned. In this preferred structure the pre-amplifier is a current-sensitive amplifier, having extremely low input impedance compared to the ordinary amplifier. The main amplifier 88 may be a high impedance input amplifier.

The pre-amplifier 86 includes an electronic switching arrangement for the purpose of providing an output signal to the main amplifier of the same polarity, regardless of the polarity of the electrodes 48 and 50. These electrodes are fed current of reversed polarity from run to run, being alternated by a manual switch ganged to the counter reset switch, so that polarizing effects on electrode surfaces will be minimized. It will be recalled that the exciting current flowing through the fluid of the aperture is direct current. An electronic switch is used so that mechanical contacts are not required to switch low level signals but switch relatively high level control voltages which do not carry signal components and therefore such contacts may be located at a distance for operating convenience.

Each grid of the output tubes provided in the preamplifier is connected to the opposite phase of a phase inverter which immediately precedes a dual triode and one or the other phase is selected by biasing off the appropriate triode by means of a high negative bias which is derived from the power supply 94 and applied through a polarity reversing switch to the grid of the desired tube.

The main amplifier 88 is a high gain amplifier, the practical example of which had a total gain of about 5000. The output from the main amplifier is applied by the channel 96 to a high pass filter and a D.C. restorer 98. The filter is a small condenser of the order of 25 micromicrofarads operating into a diode, serving as a D.C. restorer.

The low impedance output 100 which receives the signal from the D.C. restorer 98 by way of channel 102 is an A.C. coupled augmented cathode follower circuit. The output circuit 100 is required to drive the expander amplifiers and, hence it is applied by the channels 104 and 106 to the expander amplifiers 108 and 110, respectively. The low impedance output prevents loading by the expander amplifiers. That is, the lower threshold circuit will not load the signal pulse to change the apparent height of the upper threshold. The phase inverter 112 is an anode follower receiving the output signal on channel 114 and applying the same to the deflection plates of the cathode ray tube 116 by the channels 118. Other deflection circuits are associated with the phase inverter stage.

The main amplifier also drives the debris alarm 120 by the channel 122. The debris alarm indicates when the aperture 26 is blocked. This circuit is advantageously capable of discriminating between pulses of short duration and a pulse of long duration, discarding the short pulses, and using the long pulse for energizing an alarm device such as the acoustic device, or horn, 124 and/or performing other functions to be described. For example, when a piece of debris clings to the aperture 26, there will be low frequency signals in the output from the main amplifier which would not otherwise be present. A circuit can be used which responds only to such low frequency signals to operate the debris alarm. The debris alarm is considered hereafter in greater detail in connection with a discussion of FIG. 2.

Referring now to the low impedance output circuit 100, its primary function is to drive the two expander amplifiers 108 and 110. These amplifiers are driven into saturation and provide linear amplification only over a very small range, such as for example 6 volts of the pulse received from the low impedance output circuit 100. This six volt portion is selected by the voltage on cathodes of tubes in the expander amplifiers, and the amount of these voltages is controlled by the threshold level sets 82 and 84. This six volt portion of the pulse is amplified and a segment is selected by the threshold limiters 128 and 130, being applied to these respective stages by the paths 132 and 134. The expander amplifier has a gain of about five and drives the threshold limiter by a segment of a pulse.

The threshold limiter transmits a substantially square pulse, having an amplitude of the order of two volts, compared with the thirty volts out of the expander amplifier (six volts times gain of five), and feeds it to the brightening and dimming pulse amplifiers 136 and 138 by way of the paths 140 and 142 respectively. The gain of the brightening and dimming pulse amplifiers is of the order of 15, to provide a thirty volt pulse to the oscilloscope to brighten the beam for the period of time the instantaneous pulse voltage lies between the two chosen threshold levels. This is done by using the lower threshold initiated signal to brighten the trace, and the upper threshold initiated signal to dim the trace. The former signal is applied to the control grid of the electron gun of the cathode ray tube 116 and the latter signal is applied to the cathode electrode of this same tube. The sharpness of the pulse and the fast time is achieved by making the band width of these pulse amplifiers several megacycles.

The pulse outputs from the brightening and dimming pulse amplifiers are also applied by way of the paths 148 and 150 to the pulse amplifiers 70 and 152. A network of diodes prevents the tubes of the pulse amplifiers from drawing grid current and insures that small pulses near the baselines of the brightening and dimming pulses are not lost. The pulse is thus further amplified in the pulse amplifiers by about thirty times. The result is that the original pulse from the expander amplifier is by this time quite substantially amplified. If the original pulse from the main amplifier 88 is a very small amount over the lower threshold, that part of the pulse that does get above the threshold will be amplified sufficiently to trigger the delay univibrator 66 by way of the path 154.

Note that there are two of these pulse amplifiers 70 and 152, with their associated duplicate circuitry, so that it is possible to count or not count depending upon whether a pulse exceeds one or both thresholds. These two pulse channels are so arranged that if a pulse exceeds the first threshold and not the second, it is counted, if it exceeds both thresholds, the counting is inhibited.

The block diagram also illustrates another channel designated 196 which applies a signal from the control binary circuit 170 to disable the delay univibrator 66 until the control binary has completely recovered following the pulse from the control binary 170.

Now, associated with the debris alarm 120, connection is made by lead 200 to one input of a second control binary circuit 203. Thus, a debris alarm signal is passed to this control binary for shifting the state thereof. A well-known, selectively operable reset apparatus 202 is provided to apply an input signal to a second input of this control binary by way of lead 201 for establishing the latter circuit in a normal state.

The shifted binary provides a disabling output via leads 204 and 205 respectively to AND circuit 176 and to an INHIBIT gate 208. A clock source 207 of regular timing pulses may also provide signals by way of lead 206 to another input of the latter INHIBIT gate 208. This gate 208 thus provides output signals by way of lead 209 to a time counter 210. In this way the abnormal pulse from shifted binary 203 stops passage or particle pulses to counter 67 and of clock pulses to time counter 210. Thus, the counter 67 is actuated only by particles passing the aperture when alarm horn 124 is not actuated. At the same time the time counter 210 may provide an apparent record of the apparatus operating time during which the aperture was not clogged by debris. Since there is a direct correlation between the time recorded by counter 210 with the volume transiting the aperture, it is clear that these arrangements provide a direct indication at counter 67 of the number of particles counted in a given liquid volume, which volume is indicated by counter 210. These two related values are accurate without need for corrections for observations being made during sounding of alarm horn 124.

The above description provides an overall method of the operation of the particle analyzing apparatus and for the most part indicates the manner in which many of the desired functions are carried out. Some of the components are capable of considerable variation as to exact circuitry without chaging their functions.

Figure 2:
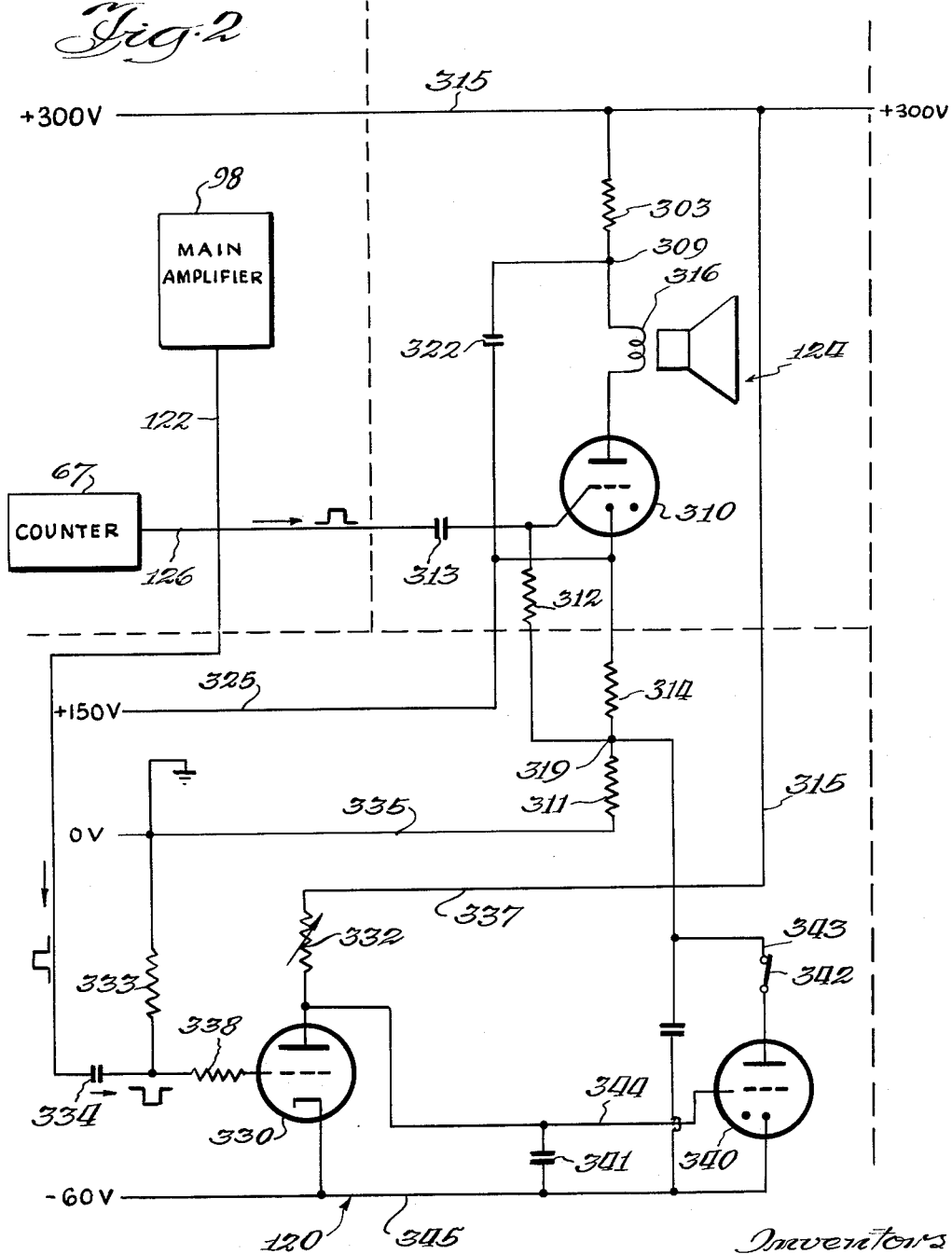
FIG. 2 is a schematic circuit diagram of debris alarm apparatus of one type constructed in accordance with the invention, the same being shown in operating relation with cooperative components similar to those of said application.

Turning next to FIG. 2, here a debris alarm acoustic device 124 is shown in schematic arrangement for advantageous employment with an element 120 of the block diagram of FIG. 1. In this diagram appropriate bias potential sources of 300 volts, 150 volts, 0 volts and −60 volts are indicated diagrammatically. It will be recalled from consideration of FIG. 1 that necessary potentials are supplied in accordance with the invention from a main power supply 94. The actual potentials on leads 315, 325, 335 and 345, of course, may be supplied at discretion from any of the many well-known potential sources.

Before consideration of the structural details of this alarm system it may be well to consider in some detail the problem presented to this alarm. The theory of operation of the alarm is based on the observation that normally sized particles to be studied, whether very small with respect to the aperture or, say, one-half the aperture diameter, move very rapidly through the aperture. Hence, such particles are in the aperture for an exceedingly short time, for example, for fifty (50) microseconds. Debris, as defined above, is anything which will not pass through the aperture. If a signal passed through the amplifier 98 is overextended in duration, say longer than 52 microseconds, a substantial obstruction in the aperture 26 is indicated. Thus, particle flow through the aperture is impeded and any count of particles which may be indicated becomes misrepresentative. The entire analyzing apparatus heretofore described only serves inaccuracy as some signals from particles in a sample are obscured in a signal generated by aperture clogging debris. Moreover the debris alarm must not operate in the presence of simply large particles which pass through, or the flexibility and versatility of the entire system is diminished.

With the circuit arrangements of FIG. 2 these problems are overcome.

The drawing of FIG. 2 is divided into three functional portions by dashed lines for illustrating more clearly the cooperation of structures of FIG. 2 with structures shown elsewhere in FIG. 1. The upper left hand portion includes the main amplifier 98 and the counter display unit 67 of FIG. 1, shown in block form. The upper right hand divided portion illustrates the acoustic device 124 of FIG. 1 in the form of an electric horn energized by appropriate circuits. Other functions may be performed instead of or in addition to sounding a horn, as will be brought out hereinafter. The lower dotted line divided portion illustrates the debris alarm control arrangements of FIG. 1 in advantageous circuit detail.

Power at desired levels, e.g., (+) 300 volts, (+) 150 volts, 0 volts (ground), and (−) 60 volts, is supplied by way of common leads 315, 325, 335, and 345 respectively.

The high voltage lead 315 is connected to the plate electrodes of gas filled triode cold cathode trigger tube 310 and input amplifier triode 330, respectively, by way of large resistor 303 and horn operating winding 316, in the first case, and by way of large variable resistor 332 in the second case. The cathode electrode of tube 310 is connected directly to the (+) 150 volt lead 325 and to the ground lead 335 by way of large voltage divider resistors 314, 311 which have a common connection point 319. The grid electrode of this tube is connected to the midpoint of these latter two resistors by way of a grid leak resistor 312. Feedback capacitor 322 is connected from a common point 309 between winding 316 and plate resistor 303 to the (+) 150 volt lead 325 and to the cathode electrode of tube 310. Without more, the values of these elements noted are coordinated for normally maintaining the gas filled triode cold cathode trigger tube 310 in a non-conducting condition. Thus, no current flows through winding 316 to operate the horn 124.

Now, pulses from a selected counter display unit 67, say the one thousand counter, are passed by way of lead 126 and coupling capacitor 313 to the trigger electrode of tube 310. Thus, in a normal quiescent condition of this arrangement, pulses of current flow through tube 310 in correspondence with these counter originated pulses on lead 126. Accordingly audible clicks are heard recurrently from the horn 124 to give indication of proper functioning of the apparatus. This is a convenient arrangement which is not essential to the operation of the invention, and may not be necessary where the counter includes a mechanical counting device.

In the normal operating condition, negative going particle signal indications, having durations which are a function of the time the corresponding particles are in transit through the aperture, are transmitted from the main amplifier 98, by way of lead 122 and coupling capacitor 334 and are applied across large grid leak resistor 333 through resistor 338 to the control electrode of normally conducting amplifier tube 330. As noted heretofore, this plate electrode is connected by way of a large variable resistor 332 to (+) 300 volt lead 315.

This plate electrode is connected also by way of lead 344 to the grid electrode of a normally non-conducting gas filled control triode 340. The plate electrode of this latter control triode is connected by way of a normally closed switch 342 and lead 343 to the common connection point 319 associated with resistors 311, 314. The (—)60 volt lead 345 is connected directly to the cathode electrodes of triodes 330, 340 and by way of capacitor 341 to lead 344.

This discussed arrangement functions, in the normal quiescent condition to hold the trigger tube 310 in a non-conducting state save for the aforementioned clicks occasioned by counter pulses on lead 126.

The normal duration negative pulses appearing on lead 122 from the main amplifier 98 drive the amplifier triode away from full conduction and thus raise the potential of lead 344. This raising in potential leads to charging of capacitor 341 through variable resistor 332. The charging voltage of lead 315 is large such that the charging of capacitor 341 (and lead 344) to an operating level for tube 340 is linear during charging intervals dictated by the duration of pulses from amplifier 98. The rate of charge is adjusted by variable resistor 332, in accordance with the expected duration of pulses from normal particles to be analyzed, such that capacitor 341 is not charged to a voltage sufficient to ignite the gas filled triode 340. Thus, this tube remains non-conducting since the partially charged capacitor 341 promptly discharges through tube 330 as soon as the negative pulse on lead 122 expires.

But, in the situation that a large debris particle obstructs the aperture in the stand of FIG. 1, the resulting large amplitude, long duration negative pulse from the amplifier 98, on lead 122, holds amplifier input tube 330 cut off for a sufficient interval to charge capacitor 341 to a voltage sufficient to turn on tube 340. Recall this required duration of charge is governed by the adjustable resistor 332. Thus, when a debris particle obstructs the aperture for a sufficient time, gas tube 340 becomes conducting. Thereafter, conduction continues in the well-known manner of gas tubes substantially independently of grid voltage. The switch 342 is provided for terminating this conduction. This switch may be operated manually or by automatic means. Where the aperture is unblocked manually, the switch 342 is manually operated. Where an automatic clearing device is used, the switch 342 may be solenoid operated or it may comprise a controlled switch of any known type.

Meanwhile, the conduction by tube 340 alters the bias of tube 310 such that the applied plate voltage causes current flow through this gas tube 310 by way of common connection point 319. This current flow gives rise to alternate charging and discharging of capacitor 322 to modulate the normal direct current flow through tube 310 and horn operating winding 316. The capacitor 322, resistor 303 and tube 310, are chosen in such a fashion in accordance with the well-known relaxation oscillator art such that the horn 124 gives an audible alarm of about 600–800 cycles whenever capacitor 341 is charged to operate tube 340 to an ON condition. Thereafter, as has been noted, switch 342 is opened to terminate conduction by gas tube 340 when the defect has been cleared.

Instead of or in addition to the horn 124, there may be other warning devices operated and functions performed. These will be described.

Other means for operating a debris alarm could be based upon low pass filter means in the path 122. Very long pulses caused by debris have a very low frequency component which could drive the debris alarm.

Figure 3:
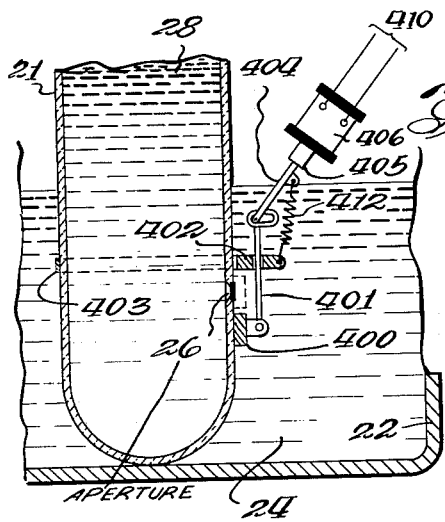
FIG. 3 is a fragmentary sectional view, but schematic and representative in character, showing an electrically operated mechanical device for clearing an obstruction in the aperture of a particle analyzing apparatus.
Figure 4:
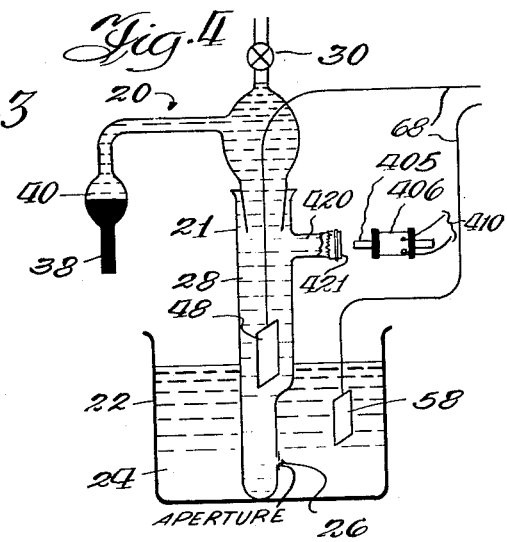
FIG. 4 is a fragmentary sectional view, also schematic and diagrammatic in character, showing another electrically operated mechanical device for clearing an obstruction from the aperture of a particle analyzing apparatus.
Figure 9:
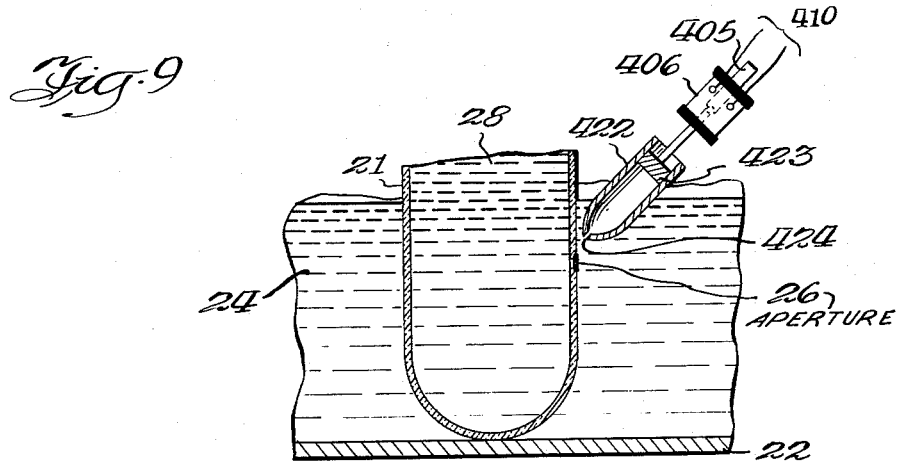
FIG. 9 is a fragmentary sectional view, schematic and diagrammatic in character, showing still another electrically operated mechanical device for clearing an obstruction from the aperture of a particle analyzing apparatus.

Attention is now invited to FIGS. 3, 4 and 9. These three figures illustrate mechanical devices whose purpose it is to clear the obstruction. In each case the mechanical device is electrically operated by some structure such as, for example, a solenoid. Looking at FIG. 2, the solenoid may be driven by the tube 310. It may, for example, have a winding such as 316 so that the solenoid is energized as soon as a signal is received which represents an abnormal condition of the scanning means. When the tube 310 is driven into conduction, the solenoid will be energized. Actually, all that is necessary is an arrangement such that the solenoid is energized momentarily, so that in addition to energizing the solenoid, the tube 310 may automatically operate the switch 342 to reestablish a non-conducting condition in that tube. This will presume that the obstruction is cleared by one movement of the clearing means. An alarm device can tell the operator the clearing means has operated and he is alerted. Any kind of pulse or signal output from the debris alarm circuit may perform the desired function.

In FIG. 3 there is illustrated an aperture tube 21 which has a body of fluid 28 therein, the tube 21 being shown disposed in the beaker 22 which has its body of fluid 24 contained therein. The electrodes 48 and 50 and their connections are not shown. The aperture of the tube is shown at 26.

A wiper member 400 is engaged against the outside surface of the tube 21 just below the aperture 26 and it is mounted on an arm 401 guided in a bracket 402 that is clamped to the tube by the clamp 403. The arm 401 is linked to the projection 404 and connected to the armature 405 of the solenoid 406. The solenoid 406 is adapted to be energized by any suitable output circuit that is driven by the debris alarm. For example, the debris alarm block 120 in FIG. 1 may have its output channel 125 connected to a form of amplifier or other devices such as that shown in FIG. 2. When a blockage is detected, there will be an output signal that momentarily energizes the solenoid 406 through the electrical circuit which is designated 410. The solenoid armature 405 is biased downwardly by the spring 412 so that the normal position of the wiper 400 is in its solid line location in FIG. 3. When the solenoid 406 is energized momentarily, it pulls the wiper member 400 up to the broken line position thereby wiping the surface of the aperture 26. This wiping action is usually sufficient to dislodge the obstruction and with the return of the wiper member 400 to its normal position, the aperture 26 once more will be in its normal operating condition. Such a wiper member may be a small rubber pad or the like.

It will be appreciated that the solenoid 406 may be connected in parallel with the winding 316 so that both operate when the tube 310 or any other signal producing device operates.

In the usual aperture tube 21, the aperture is a small hole in a sapphire wafer that is fused to the surface of the tube 21 so that the wiping action will carry the wiper 400 over the entrance of the aperture. This is the place where debris will normally obstruct the aperture since the fluid moves from the body 24 to the body 28.

In FIG. 4 another type of mechanical clearing device is shown. In this view there is a portion of the stand 20 illustrated which includes the aperture tube 21, the beaker 22 and a portion of the manometer-syphon structure. The upper fitting of the system which is completely filled with fluid is shown provided with the lateral arm of FIG. 1 which is enlarged at 40 to serve as a reservoir for the mercury of the manometer. The mercury is shown at 38, and insofar as operation of the apparatus is concerned, during use, there is no significant difference between this and prior apparatus. It will be noted, however, that the aperture tube 21 has a lateral branch 420, the open end of which is covered by a flexible diaphragm 421. A solenoid 406 is shown arranged so that its armature 405 will be driven to the left when the debris alarm operates. The armature 405 normally is slightly spaced from the diaphragm 421 so that when energized, there will be sudden sharp blow applied to the diaphragm 421. This will send a fluid pressure shock through the interior of the system which includes the aperture 21 and the fluid system above the mercury 38. Since the mercury is quite heavy and will have substantial inertia to a sudden shock wave, the only real outlet for the slight increase in volume of the fluid system within the aperture tube 21 is by way of the aperture 26 so that a fine rapid discharge momentarily occurs at the aperture 26. This will blow out the aperture and dislodge the obstruction. If necessary, a valve may operate just before the energizing of the solenoid 406 to close off the branch leading to the reservoir 40. If there are any air bubbles in the system, this arrangement may not operate as satisfactorily. Other elasticity will have like effect.

In FIG. 9 which is quite similar to that of FIG. 3, instead of the arrangement with the wiper, there is a small jet tube 422 driven by a piston 423 that is actuated by the solenoid armature 405. The jet tube 422 tapers to a very fine nozzle 424 that is directed at the aperture 26. When the solenoid 406 is energized, a slight movement of the plunger 423 downwardly and to the left will shoot a fine stream of fluid at the entrance to the aperture 26 and thereby clear the same of debris. The nozzle 424 may be immediately adjacent the aperture 26. The jet tube 422 is suitably supported by means not shown and is fully immersed top and bottom in the body of fluid 24 so that it will always be filled with fluid.

Figure 5:
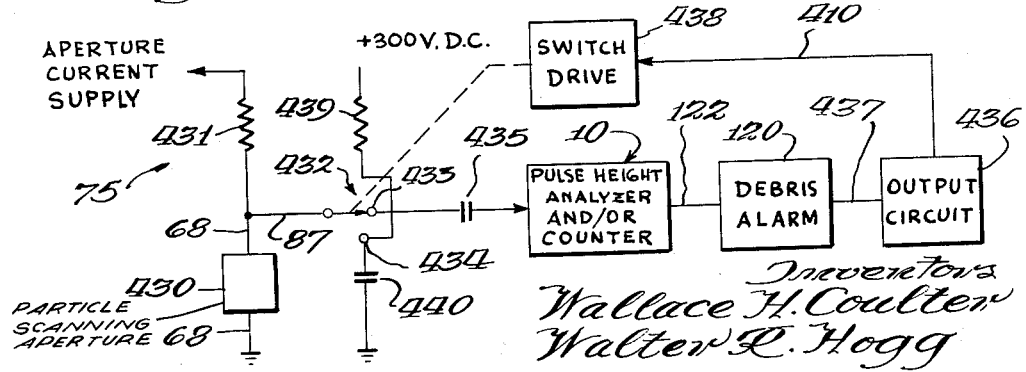
FIG. 5 is a circuit diagram of an electrical device for clearing an obstruction from the aperture of a particle analyzing device.

In FIG. 5 there is illustrated another method of clearing the aperture 26. In this view the aperture tube and its electrode connections are designated by the block 430 and termed aperture impedance element, the electrical channel connecting the electrodes being designated 68 as in FIG. 1. The entire aperture circuit with its attendant current supply, etc. are designated generally 75. The aperture current supply resistor is shown at 431.

As seen, the output channel from the aperture circuit is shown as 87 in FIG. 1 and this is designated 87 also in FIG. 5 although it will be appreciated that the signal appears from the lead 87 to ground. The lead connects with a switch 432 which is symbolically shown having an arm pivoted at the left adapted to move between two contacts 433 and 434. This switch 432 may be mechanically driven by a solenoid or it may be electronic, operating through the means of a gas triode, a silicon controlled rectifier, or even a switching transistor. The normal condition of the switch means is closed to the contact 433 so that the signal is coupled through the condenser 435 to the pulse height analyzer and/or counter 10 shown as a block. All of the apparatus of FIG. 1, by means of which the normal pulses caused by particles flowing through the aperture perform various functions, are included in the block 10. In this case the debris alarm may be as shown operated by way of the channel 122 into a suitable output circuit which amplifies or energizes or in some way produces an output signal or current only when the debris alarm is energized by blockage in the aperture. The output circuit as explained may be similar to that of FIG. 2. It is designated generally 436 and is connected by way of the channel 437 to the debris alarm. As an example, the output circuit may energize a coil or other means to achieve the desired function. The switch drive which is designated generally 438, may well be a solenoid operating the switch 432 or any of the other means described.

As soon as the output circuit energizes the switch drive 438, the switch 432 is momentarily switched to the contact 434. A high speed electronic switch can easily perform this function. The contact 434 is in a circuit which extends from a high voltage supply such as a +300 volts D.C. source through a resistor 439 about the contact 434 and a series condenser 440 below the contact 434, the latter being connected to ground. When the switch 432 is closed upon the contact 434, it completes a circuit which includes the aperture impedance element 430 and the condenser 440. It will be seen that the condenser has been charging up toward 300 volts D.C. while the device was operating normally and as soon as the circuit through the condenser is completed, it will discharge through the aperture 430 with a very high current flow, thereby literally heating the contents of the aperture to explode, driving the obstruction out of the aperture. It will be obvious that for the time spent in the clearing of obstruction there will be no information passing to pulse the height analyzer and/or counter so that there will be no inaccurate or erroneous information recorded or tabulated. Assuming that the sample run is being timed by some timing means also driven at the same time that the pulse height analyzer and/or counter is being actuated, there will be no need to discard the data of the particular run.

It is preferred that the RC constant of the condenser charging circuit be such that the condenser 440 will be charged to a voltage quite close to the maximum within the period of about a second. Thus if the first discharge does not clear the aperture or there are repeated obstructions, these may be cleared at a rapid rate.

In FIG. 5 the debris alarm 120 was assumed to be a part of the circuit of the pulse height analyzer and/or counter much as in the case of FIG. 1.

Figure 6:
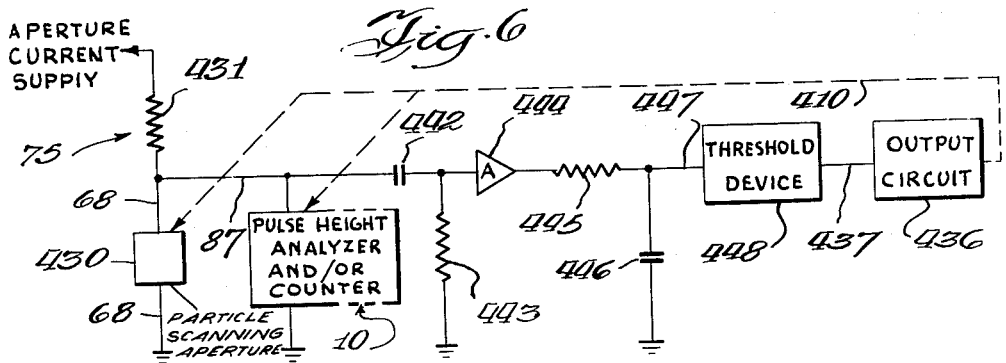
FIG. 6 is a circuit diagram of a simple debris alarm, the same shown as an accesory for or adjunct to a particle analysis apparatus instead of being incorporated therein.

FIG. 6 is a circuit and diagrammatic view showing the construction and arrangement for a debris alarm which is capable of being constructed as an adjunct or accessory to already existing counting and sizing apparatus. As a matter of fact, such a debris alarm need not be related with apparatus responsive to the signals from normal particles but may be independent thereof.

As seen, the aperture and related circuitry comprising the aperture impedance element are again designated by the reference character 430 and supplied with current through the resistor 431 through lead 68. The lead 87 in this case extends through an isolating or coupling capacitor 442 which is connected to ground through a resistor 443. The combination of the capacitor 442 and the resistor 443 has a time constant which may be approximately 20 times the duration of a normal pulse so that there will be little signal loss to the amplifier and the resistor-capacitor combination 445, 446. The amplifier 444 serves as an additional isolating device.

The combination resistor and capacitor 445, 446 also has a long time constant and is followed by a threshold device 448 which will have an output only if the signal at the lead 447 reaches a value determined by the threshold level adjustment and built into the threshold device. Any small pulses of normal duration which go through the combination 442, 443 and the amplifier 444 will not be sufficient in time duration to build up the charge on the capacitor 446 sufficient that the voltage at the lead 447 reaches the threshold, and therefore, there will be no output from the threshold device 448 from these short time duration signals. When, however, a long duration time signal appears, it will be sufficient to build up the voltage on the condenser 446 to a point at or above the level set by the threshold device 448 so that there will be an output which may be amplified in the output device 436 and used for purposes previously described.

As shown, there is a symbolic line 410 which extends to the counting and sizing apparatus 10 which may turn it off or stop it from counting, stop a clock, and in addition, another arrow extends to the aperture impedance element 430 for the purpose of clearing the obstruction by any one of the structures shown in FIGS. 3, 4, 5 and 9.

A convenient means of sensing pulses of long duration produced by debris or overlarge particles is to amplify and perhaps to limit pulse segments which exceed a predetermined threshold level. Generally the threshold level may be a voltage (or a current) which corresponds to an especially large particle, perhaps two-thirds of the diameter of the orifice. By amplifying and limiting such segments, pulses of rapid rise and fall times and uniform amplitude may be produced and more readily used in operating the output circuit of the debris alarm for various purposes.

A structure which accomplishes the functions mentioned above is shown in FIG. 7 and the wave shapes in the various locations of the circuit are shown on a common time axis in FIG. 8.

Referring now to FIG. 7, the aperture circuit 75 is illustrated with the aperture impedance element 430, its channel 68 and the lead 87 extending through the amplifier which may be the amplifier 36 and 88 of FIG. 1. The pulse height analyzer and/or counter is shown at 10.

Pulses from the amplifier are applied by way of the channel 450 to a debris theshold level 451. This is a circuit in which by suitable means such as electronic tubes, semi-conductors, diodes and the like, a threshold level is established so that no output will be abtained on the channel 452 unless the incoming pulses exceed the threshold level. In FIG. 8 at A, there is illustrated a group of pulses on a time axis, these pulses being shown somewhat exaggerated in their time duration. The pulses 453, 454, 455, 456 and 457 will be assumed to have been produced as a result of particles passing through the aperture 26 and acting upon the aperture impedance element 430 to produce signals related to their size. The threshold level is set at 458, this being any desirable level above which it is known that the pulse caused by debris will extend. A debris pulse is shown at 459, and it will be noted that this pulse rises to its maximum amplitude and then commences to taper off. The reason for this is that although the debris may hang up in the aperture, there will no longer be a change in the impedance and the condenser input to the amplifier will therefore not recognize the continuous obstruction. The pulse 459 is much longer in duration than any of the particle pulses even though two of them, namely, 456 and 457 exceed the threshold 458 also.

The output at 452 consist of the tips of the pulses 456, 457 and 459, which are designated 456', 457' and 459' at B in FIG. 8. These pulses are applied to an amplifier limiter 460 which amplifies them and clips their top ends so that they are all the same amplitude as shown at 456", 457" and 459" in FIG. 8 at C. These pulses which are in the form of rectangular pulses are now applied by way of the channel 462, to a converter circuit 463 which converts the duration of the pulses into other output pulses whose amplitude is a function of the time duration of the respective pulses producing the output pulses. Such a circuit, for example, could be a phantastrom in which the leading edge of an input pulse commences to produce an output pulse which rises linearly until the trailing edge of the input pulse cuts off the operation of the circuit. As a result the output from the converter 463 of the channel 464 will be a series of triangular shaped pulses such as shown at 456''', 457''' and 459''' in FIG. 8 at D. From the converter circuit 463 the triangular pulses are applied to another threshold circuit 465 in which the threshold level 466 is adjusted to be at a point at which the amplitude of triangular signals represent a time duration much greater than that at which a normal particle, even a large one, will be in the aperture. As a result, none of the converted signals caused by normal particles will ever reach the threshold level 466 while debris pulses will do so. As seen, the pulse 459''' does exceed the threshold level 466 and therefore, there will be an output at 467 which is in the form of the triangular tip 470 of the signal 459'''. This small pulse 470, as shown at E, is suitably amplified in any well known amplifier 471 to get an output signal 472 as shown at F in FIG. 8. This output signal may be used directly or drive some form of output circuit as shown at 436. Such an output circuit has been described and it need not be used if the signal 472 is strong enough. Assuming that the output circuit 436 provides one or more energizing signals, voltages, or currents for operating various structures, it may operate an alarm such as shown at 124 by way of the channel 125, it may clear the aperture 26 by way of the channel 410 using any of the structure described above, it may cut off the pulse height analyzer and/or counter 10, or it may do a combination or all of these.

Other embodiments will occur to those skilled in the art in view of the disclosure above. For example, longer than normal pulses may be used other than as described above. The amplified limited pulse segments of C in FIG. 8 may be compared in duration with a univibrator which is triggered by the front edge of the respective pulse segments and which has a duration slightly longer than the longest normal particle pulse likely to be encountered. Pulse segments of longer duration than the reference univibrator pulse duration would cause a gate circuit to produce a debris signal which in turn may be amplified, operated upon and so forth.

Figure 10:
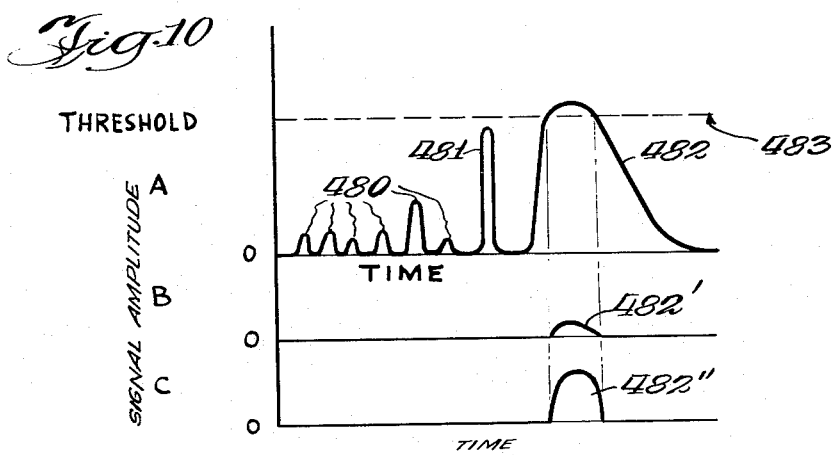
FIGS. 10 and 11 are similar to FIGS. 7 and 8 respectively, except that the means for discriminating between particle-caused signals and debris-caused signals uses only amplitude characteristics of said signals.

It should be pointed out that the circumstances under which normal particle-caused signals exceed the amplitude of debris-caused signals are usually infrequent. They do occur, however, and when they do, a duration discriminating circuit will not be energized, since the duration of a normal pulse is positively limited by the physical length of the aperture plus the exterior sensing zone having high current density, and particle length. Thus, the pulses 456 and 457 are infrequent. The usual condition is that shown in FIG. 10 at A, this representing a group of normal pulses of low amplitude at 480, an occasional high amplitude pulse 481 caused by a very large particle, and a debris-caused pulse 482. The abnormal pulse 482 has a substantially greater amplitude (which may be current or voltage) than all of the others.

Figure 11:
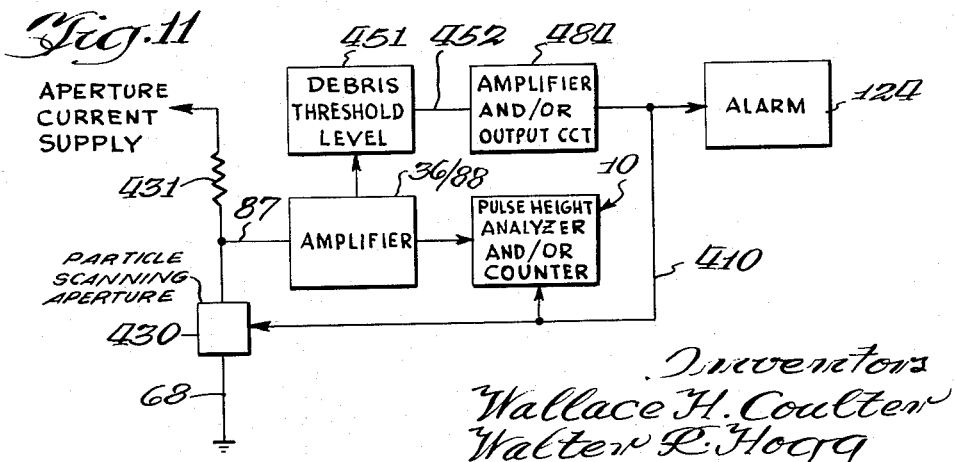

A fairly simple debris alarm circuit may be connected as shown in FIG. 11, differing from the structure of FIG. 7 in the elimination of the three stages 460, 463 and 465. Here a simple threshold level circuit 451 discards all pulses which fail to have an amplitude exceeding the predetermined level 483 so that the only signal which passes to the next stage is the upper portion 482' of 482. This is shown at B in FIG. 11, appearing at the output 452 in FIG. 11. If large enough, this pulse 482' may be applied directly to the output circuit 484 or to an amplifier for improving its gain as shown at 483" at C in FIG. 10. The resulting output signal on channel 410 may operate the alarm 124, cut off the counter 10, and/or clear the aperture 26. The infrequent particle-caused pulse exceeding the threshold level 483 will also operate the debris alarm circuit and such false indications may be offset by the benefits of economy and simplicity.

The circuits described herein are suitable for use with either of the above referred to Coulter particle devices where the input to the alarm circuit follows at least after the pre-amplifier, but for a circuit such as shown in FIG. 6, care must be taken to achieve sufficient signal for charging the condenser 446. In the patented Coulter device using a high input impedance amplifier stage connected directly with the aperture impedance element 430, there is no problem. In the circuit of FIG. 1, however, the low impedance input of amplifier 36 may prevent any appreciable signal from passing to the simple direct-connected debris alarm of FIG. 6 and hence other means must be used or added to achieve the desired results.

Other modifications are capable of being made without departing from the spirit or scope of the invention as defined in the appended claims.

What it is desired to secure by Letters Patent of the United States is:

1. In a particle studying device having an aperture through which particles to be studied pass and means for generating electric pulses in response to the presence of a particle or piece of debris at the aperture, the duration of each pulse being a function of the length of time its respective particle or piece of debris is present at the aperture, a debris alarm comprising:
   (a) means for detemining whether the duration of an electric pulse received from the generating means exceeds a predetermined time interval and for transmitting an output signal indicative of a determination that a pulse has a duration in excess of the predetermined time interval; and
   (b) warning means for issuing an alarm in response to the receipt of an output signal from the determining means indicating that a pulse has been determined to have a duration in excess of the predetermined time interval
whereby a warning of the presence of a large particle or piece of debris at the aperture is generated.

2. Apparatus as set forth in claim 1 comprising in addition:
   (a) means for maintaining the alarm signal once the warning means has issued an alarm signal; and
   (b) means for stopping the alarm signal.

3. Apparatus as set forth in claim 2 wherein the stopping means are manually operable.

4. Apparatus as set forth in claim 1 wherein the determining means comprise a low pass filter which transmits the low frequency component of a pulse having a duration in excess of the predetermined time.

5. Apparatus as set forth in claim 1 wherein the determining means comprise a circuit insensitive to all pulses having durations which are less than the predetermined time.

6. Apparatus as set forth in claim 1 wherein the determining means comprise in addition:
   means for determining when the amplitude of a pulse generated by the presence of a particle or a piece of debris exceeds a predetermined level
whereby an output signal is generated when the duration of a pulse exceeds the predetermined time and the amplitude of that pulse exceeds the predetermined level.

7. Apparatus as set forth in claim 1 wherein the warning means comprise electronic amplifier means having an input circuit connected to be energized by the determining means and an output circuit; a power source for the amplifier means, the amplifier means having one state in which the power source will cause a current to flow in the output circuit and a second state in which substantially less current flows in the output circuit; means biasing the amplifier means to the second state when the input circuit is not energized by the determining means; and means, connected to the output circuit, for producing an indicating signal when the amplifier means are in the first state.

8. Apparatus as set forth in claim 7 comprising in addition:
   (a) means for causing the amplifier means to remain in first state after the input circuit has been energized once; and
   (b) means for causing the amplifier to return to the second state.

9. Apparatus as claimed in claim 7 in which the indicating means comprise an audio oscillator and an acoustic device driven by the oscillator, the oscillator being connected to be energized when the amplifier means are in the first state and de-energized when the amplifier means are in the second state.

10. Apparatus as set forth in claim 1 wherein the warning means comprise audible alarm means.

11. Apparatus as set forth in claim 10 comprising in addition:
   (a) means for maintaining the audible alarm signal once the warning means has been energized; and
   (b) means for stopping the audible alarm signal.

12. Apparatus as set forth in claim 1 comprising in addition means for disabling the operation of the particle studying device in response to the receipt of an output signal from the determining means indicating that a pulse has been determined to have a duration in excess of the predetermined time interval.

13. Apparatus as set forth in claim 1 wherein the warning means comprise means for interrupting the operation of the particle studying device.

14. Apparatus as set forth in claim 1 comprising in addition:
   means for clearing the aperture of obstructions in response to the receipt of an output signal from the determining means indicating that a pulse has been determined to have a duration in excess of the predetermined time interval.

15. In a particle studying device having an aperture through which particles to be studied pass and means for generating electric pulses in response to the presence of a particle or piece of debris at the aperture, the duration of each pulse being a function of the length of time its respective particle or piece of debris is present at the aperture a debris alarm comprising:
   (a) means for determining whether the duration of an electric pulse received from the generating means exceeds a predetermined time interval and for transmitting an output signal indicative of a determination that a pulse has a duration in excess of the predetermined time interval; and
   (b) clearing means for clearing the aperture of debris in response to the receipt of an output signal from the determining means indicating that a pulse has been determined to have a duration in excess of the predetermined time interval
whereby an obstruction in the aperture may be detected and removed.

16. Apparatus as set forth in claim 15 wherein the clearing means comprise:
   (a) a wiper engaged against a surface adjacent to the entrance of the aperture; and
   (b) means for moving the wiper across the entrance of the aperture in response to the receipt of an output signal from the determining means indicating that a pulse has been determined to have a duration in excess of the predetermined time interval.

17. Apparatus as set forth in claim 15 wherein the clearing means comprise:
   (a) a cylinder, adapted to contain a fluid, having a nozzle directed at the entrance of the aperture; and
   (b) means for moving the fluid from the interior of the cylinder through the nozzle, to the entrance of the aperture upon receipt of an output signal from the determining means indicating that a pulse has been determined to have a duration in excess of the predetermined time interval.

18. Apparatus as set forth in claim 17 wherein the fluid moving means comprise a piston slidably engaged within the cylinder.

19. Apparatus as set forth in claim 15 wherein the clearing means comprise:
   means for reversing the direction of fluid passage through the aperture.

20. Apparatus as set forth in claim 19 wherein the reversing means comprise:
   (a) a diaphragm in fluid connection with the aperture; and
   (b) means for striking the diaphragm in response to the receipt of an output signal from the determining means indicating that a pulse has been determined to have a duration in excess of the predetermined time interval.

21. Apparatus as set forth in claim 20 wherein the diaphragm is in fluid connection with the exit of the aperture.

22. Apparatus as set forth in claim 15 wherein the clearing means comprise:
   means for causing a high electric current density in the aperture in response to the receipt of an output signal from the determining means indicating that a pulse has been determined to have a duration in excess of the predetermined time interval.

23. Apparatus as set forth in claim 22 wherein the means for causing a high electric current density in the aperture comprise:
   (a) an electric energy storage device;
   (b) means for providing electric energy to charge the storage device; and
   (c) means for discharging the storage device through a circuit comprising an electric path in the aperture in response to the receipt of an output signal from the determining means indicating that a pulse has been determined to have a duration in excess of the predetermined time interval.

24. Apparatus as set forth in claim 23 wherein the electrical energy storage device comprises a capacitor.

25. A debris alarm for warning of the presence of a large particle or piece of debris at a scanning aperture of a particle studying device having means for generating electric pulses in response to the presence of a particle or piece of debris at the aperture, the duration of each pulse being a function of the length of time its respective particle or piece of debris is present at the aperture, comprising:
   (a) means for determining whether the duration of an electric pulse received from the generating means exceeds a predetermined time interval and for transmitting an output signal indicative of a determination that a pulse has a duration in excess of the predetermined time interval; and
   (b) warning means for issuing an alarm in response to the receipt of an output signal from the determining means indicating that a pulse has been determined to have a duration in excess of the predetermined time interval
whereby a warning of the presence of a large particle or piece of debris at the aperture is generated.

26. Apparatus as set forth in claim 25 comprising in addition:
   (a) means for maintaining the alarm signal once the warning means has issued an alarm signal; and
   (b) means for stopping the alarm signal.

27. Apparatus as set forth in claim 26 wherein the stopping means are manually operable.

28. Apparatus as set forth in claim 25 wherein the determining means comprise a low pass filter which transmits the low frequency component of a pulse having a duration in excess of the predetermined time.

29. Apparatus as set forth in claim 25 wherein the determining means comprise a circuit insensitive to all pulses having durations which are less than the predetermined time.

30. Apparatus as set forth in claim 25 wherein the determining means comprise in addition:
   means for determining when the amplitude of a pulse generated by the presence of a particle or a piece of debris exceeds a predetermined level
whereby an output signal is generated when the duration of a pulse exceeds the predetermined time and the amplitude of that pulse exceeds the predetermined level.

31. Apparatus as set forth in claim 25 wherein the warning means comprise electronic amplifier means having an input circuit connected to be energized by the determining means and an output circuit; a power source for the amplifier means, the amplifier means having one state in which the power source will cause a current to flow in the output circuit and a second state in which substantially less current flows in the output circuit; means biasing the amplifier means to the second state when the input circuit is not energized by the determining means; and means, connected to the output circuit, for producing an indicating signal when the amplifier means are in the first state.

32. Apparatus as set forth in claim 31 comprising in addition:
   (a) means for causing the amplifier means to remain in first state after the input circuit has been energized once; and
   (b) means for causing the amplifier to return to the second state.

33. Apparatus as claimed in claim 31 in which the indicating means comprise an audio oscillator and an acoustic device driven by the oscillator, the oscillator being connected to be energized when the amplifier means are in the first state and de-energized when the amplifier means are in the second state.

34. Apparatus as set forth in claim 25 wherein the warning means comprise audible alarm means.

35. Apparatus as set forth in claim 34 comprising in addition:
   (a) means for maintaining the audible alarm signal once the warning means has been enregized; and
   (b) means for stopping the audible alarm signal.

36. Apparatus as set forth in claim 25 comprising in addition means for disabling the operation of the particle studying device in response to the receipt of an output signal from the determining means indicating that a pulse has been determined to have a duration in excess of the predetermined time interval.

37. Apparatus as set forth in claim 25 wherein the warning means comprise means for interrupting the operation of the particle studying device.

38. Apparatus as set forth in claim 25 comprising in addition:
   means for clearing the aperture of obstructions in response to the receipt of an output signal from the determining means indicating that a pulse has been determined to have a duration in excess of the predetermined time interval.

39. A debris alarm for warning of the presence of a large particle or piece of debris at a scanning aperture of a particle studying device having means for generating electric pulses in response to the presence of a particle or piece of debris at the aperture, the duration of each pulse being a function of the length of time its respective particle or piece of debris is present at the aperture, comprising:
   (a) means for determining whether the duration of an electric pulse received from the generating means exceeds a predetermined time interval and for transmitting an output signal indicative of a determination that a pulse has a duration in excess of the predetermined time interval; and
   (b) clearing means for clearing the aperture of debris in response to the receipt of an output signal from the determining means indicating that a pulse has been determined to have a duration in excess of the predetermined time interval
whereby an obstruction in the aperture may be detected and removed.

40. Apparatus as set forth in claim 39 wherein the clearing means comprise:
   (a) a wiper engaged against a surface adjacent to the entrance of the aperture; and
   (b) means for moving the wiper across the entrance of the aperture in response to the receipt of an output signal from the determining means indicating that a pulse has been determined to have a duration in excess of the predetermined time interval.

41. Apparatus as set forth in claim 39 wherein the clearing means comprise:
    (a) a cylinder, adapted to contain a fluid, having a nozzle directed at the entrance of the aperture; and
    (b) means for moving the fluid from the interior of the cylinder through the nozzle, to the entrance of the aperture upon receipt of an output signal from the determining means indicating that a pulse has been determined to have a duration in excess of the predetermined time interval.

42. Apparatus as set forth in claim 41 wherein the fluid moving means comprise a piston slideably engaged within the cylinder.

43. Apparatus as set forth in claim 39 wherein the clearing means comprise:
    means for reversing the direction of fluid passage through the aperture.

44. Apparatus as set forth in claim 43 wherein the reversing means comprise:
    (a) a diaphragm in fluid connection with the aperture; and
    (b) means for striking the diaphragm in response to the receipt of an output signal from the determining means indicating that a pulse has been determined to have a duration in excess of the predetermined time interval.

45. Apparatus as set forth in claim 44 wherein the diaphragm is in fluid connection with the exit of the aperture.

46. Apparatus as set forth in claim 39 wherein the clearing means comprise:
    means for causing a high electric current density in the aperture in response to the receipt of an output signal from the determining means indicating that a pulse has been determined to have a duration in excess of the predetermined time interval.

47. Apparatus as set forth in claim 46 wherein the means for causing a high electric current density in the aperture comprise:
    (a) an electric energy storage device;
    (b) means for providing electric energy to charge the storage device; and
    (c) means for discharging the storage device through a circuit comprising an electric path in the aperture in response to the receipt of an output signal from the determining means indicating that a pulse has been determined to have a duration in excess of the predetermined time interval.

48. Apparatus as set forth in claim 47 wherein the electrical energy storage device comprises a capacitor.

References Cited by the Examiner

UNITED STATES PATENTS

| | | | |
|---|---|---|---|
| 2,102,951 | 12/1937 | Hackenberg | 331—131 |
| 2,437,876 | 3/1948 | Cohn | 340—384 |
| 2,475,063 | 7/1949 | Thalner | 331—129 X |
| 2,988,708 | 6/1961 | Schmidt | 340—384 |
| 3,165,692 | 1/1965 | Isreeli et al. | 324—71.4 |

OTHER REFERENCES

Berg, Robert H., ASTM Special Technical Publ. No. 234, Symposium on Particle Size Measurement, pages 245–255. TA 406.7 A5 1958. Pub. by the American Society for Testing Materials, 1916 Race St., Philadelphia 3, Pa.

NEIL C. READ, *Primary Examiner.*

WALTER L. CARLSON, *Examiner.*

C. F. ROBERTS, R. M. ANGUS, *Assistant Examiners.*